United States Patent [19]

Kim

[11] Patent Number: 4,778,130

[45] Date of Patent: Oct. 18, 1988

[54] ULTRA HYPERSONIC AIRCRAFT

[76] Inventor: Kyusik Kim, 5026 Rhoads Ave., Santa Barbara, Calif. 93111

[21] Appl. No.: 860,915

[22] Filed: May 8, 1986

[51] Int. Cl.$^4$ ............................................. B64D 27/24
[52] U.S. Cl. .................................... 244/53 R; 244/57; 244/117 A
[58] Field of Search .............. 244/118.5, 117 A, 53 R, 244/58, 57

[56] References Cited

U.S. PATENT DOCUMENTS

3,369,782  2/1968  Billig et al. ...................... 244/117 A
3,929,305 12/1975  Sabol ............................... 244/117 A Primary Examiner—Joseph F. Peters, Jr.
Assistant Examiner—Rodney A. Corl
Attorney, Agent, or Firm—Daniel J. Meaney, Jr.

[57] ABSTRACT

An ultra hypersonic aircraft having aerodynamic heat transferring pipes forming an airframe structure is shown. The heat transformer pipes include a high pressure steam generator located at the forward section thereof and a low pressure steam condensator located at the rearward section thereof. Low pressure water is circulated between the rearward section and the forward section for heat balancing of the air frame structure and for operating the room air conditioning system of an aircraft. A steam pressure reactant turbine, which drives an electric generator, is used as a boundary between the high and low pressure steam sections. The electric generator provided electrical and power supply for the infrared or arc heaters, and electric heaters recessed in the ceiling and wall panels of an aerodynamic lift-thrust generating channel for back-heating of the turbo-ram oval thrust stream in the thrust generating channel of a hypersonic aircraft. The thrust generating channel steam cooled ram constriction vane diffuser as the air intake of a turbo-ram induction jet engine and includes a steam cooled ignition-combustion chamber inductor vanes of a ram induction jet oval thrust nozzle, oval thrust nozzle located forward of a steam cooled vacuum cell wing for enhancing the vacuum induction thrust force generated on the wing and an aerodynamic heat sink is used to transform the thrust power generation.

11 Claims, 4 Drawing Sheets

ULTRA HYPERSONIC AIRCRAFT

BACKGROUND OF THE INVENTION

1. Field of the Invention

An ultra hypersonic aircraft is disclosed having aerodynamic heat transferring pipes welded to the airframe skin plate is shown. The airframe structure, both the forward and rearward sections are used as an aerodynamic heat sink to transform the heat into thrust power generation.

The heat transferring pipes consists of high pressure steam generation section and low pressure water circulation section for aerodynamic heat balancing of a high speed airframe.

The high pressure steam generation section consists of high pressure feed water pipes and an evaporated steam header both of which are connected by loop layers and finned tube aerodynamic heat immersion coils located on the forward-lower portion of the aerodynamic compression heat zone of a disk airframe to generate evaporated steam.

One portion of the evaporated steam flow through the ram constriction vane diffuser and other portion of the evaporated steam flows through a leading wedge perimeter and leading top airfoil of a disk airframe to provide an aerodynamic heat shield and for generating superheated steam.

The superheated steam flows through the steam turbine electric generator and to a low pressure steam condensation. Steam condenser cells are located between the airframe skin plate and the insulated inner plate on the rearward section of an airframe to provide aerodynamic cooling during high speed flight.

The evaporated steam distribution line utilize thermostatic steam valves to steam cooled inductor vanes and to steam cooled ignition-combustion chambers of the turbo-ram induction jet engine. The evaporated steam distribution line also include a pressure relief safety valve for discharging excessive pressure steam into the low pressure steam side of the system.

The low pressure steam side communicates with a steam condenser cell, a condensed water receiver tank and feed water pumps for condensed water as to recycle the same to the high pressure steam generation. The condensed water receiver tank comprises of a vaporizing steam purge valve and steam purge pipe sleeves which pass through a fixed bearing in the wing support and which stub into the steam chamber wing cell located adjacent the leading edge of wing. The steam chamber wing cell includes downstreamwardly inclined orifices located on the top panel adjacent the leading edge of a vacuum cell wing. The orifices distribute steam on the top panel of a wing and a steam film boundary layers is formed between the thrust stream and the wing top surface what functions to steam cool the vacuum thrust wing.

During high altitude operation, the steam density is greater than the airstream density and the steam density enhances the pressure generation on the vacuum thrust generating wing. The steam of the thrust stream absorbs the infrared radiant heat to thermally expand the thrust stream in the aerodynamic generating channel. The distributed steam also functions to cool the wing skin temperature.

The steam turbine electric generator is operatively coupled to the infrared or arc heaters. The electric heater elements are recessed in the ceiling and wall panels of an aerodynamic channel over the vacuum lift-thrust generating wing, and are recessed with circular-parabolic sectional shape of a reflector sheath. The reflector sheath consists of a half circular chamber with ceramic ring spacers for supporting the electric heater elements.

The reflector sheath has a radiant heat output opening formed of front and rear parabolic lips what extend from the circular chamber. The rear lip is longer than the front lip and both lips terminate on the surfaces of ceiling and wall panels. The radiant heat output openings are oriented in three directions toward both of the inner sidewalls and the ceiling and over the top panel of vacuum thrust generating wing within the aerodynamic channel of an ultra hypersonic aircraft.

2. Description of the Prior Art

The use of the pipes, channels or unistrouts as a dryform airframe structure and heat shield top covering on a spacecraft or a rocket nosecone to protect the airframe from the intense heat produced during high speed flight is known.

Common types of such heat shields are heat sinks and ablation shields. A heat sink absorbs heat thus preventing heat from reaching delicate parts of the spacecraft. One known heat sink is a high temperature heat proof tile which is located on the aerodynamic heating portion of a hypersonic vehicle. An ablation shield absorbs heat by melting and vaporizing permitting the airstream passing by the vehicle to carry away from the vehicle the molten particles and gas vapor.

SUMMARY OF THE PRESENT INVENTION

The present invention relates to a new and novel ultra hypersonic aircraft having an airframe constructed with aerodynamic heat transferring pipes welded within an airframe skin plate forming an airframe structure. The aerodynamic heat transforming means communicates with a high pressure steam turbine electric generator and low pressure steam condensation for aerodynamic heat sink transformation into thrust power generation during high speed flight.

The airframe structure comprises a high temperature aerodynamic compression heating portion located at the forward section and a low temperature aerodynamic cooling portion located at the rearward section. The high temperature aerodynamic heating portion encloses a finned tube immersed between an aerodynamic heating skin plate and an insulated inner plate. The aerodynamic heat immersion coil produces steam by conduction heat transfer from the intense aerodynamic heat generated during high speed flight. The low temperature portion of the airframe comprises a low pressure steam condenser cell to produce condensed water by convection heat transfer to the air stream.

The inlet to the heat immersion coil is supplied with condensed water by means of a high pressure feed pump mounted on a condensed water receiver tank. The outlet of the heat immersion coil is operatively coupled to a steam header which functions as a high pressure side of an aerodynamic heated steam generation power plant having a pressure and volume of steam which is a function of aerodynamic heating relative to the speed and other operating parameters of flight.

The high pressure feed water passes through the aerodynamic heat immersion coil to produce an evaporated steam then flow through a ram constriction vane diffuser and through the leading wedge perimeter of a disk-airframe to generate superheated steam from the intense aerodynamic compression heat.

The high pressure steam is applied to a pressure reactant turbine electric generator which, in turn, applies the steam to the low pressure side of condensed water accumulator through a condenser cell.

The evaporated steam header comprising a thermostatic steam valve for steam cooling an ignition-combustion chamber and the inductor vanes of a ram-induction jet engine. The condensed water receiver tank comprises a vaporized steam purge valve to maintain a low pressure in the receiver tank and for the steam cooling of the vacuum lift-thrust generating channel for back heating of the thrust stream. The back heating using aerodynamic heat enhances thrust power generation achieving conservation of the fuel consumption, solves the intense high temperature engine skin problem for high velocity thrust stream generation and avoids the problems of aerodynamic heating on the hypersonic airframe.

BRIEF DESCRIPTION OF THE DRAWING

The foregoing and other advantages and features of this invention will become apparent from the following description of the preferred embodiment, when considered together with the illustrations and accompanying drawing which includes the following Figures.

DESCRIPTION OF THE PREFERRED EMBODIMENT

The ultra hypersonic aircraft is constructed with aerodynamic heat transferring pipes welded within the airframe skin plate forming an airframe structure. The aerodynamic heat transfer system extends from the forward section to the rearward section of the aircraft and include a high pressure steam section and the low pressure steam condensation section. The system includes a steam pressure reactant turbine electric generator for aerodynamic heat sink transformation of the aerodynamic heating to thrust power generation.

Figure 1:
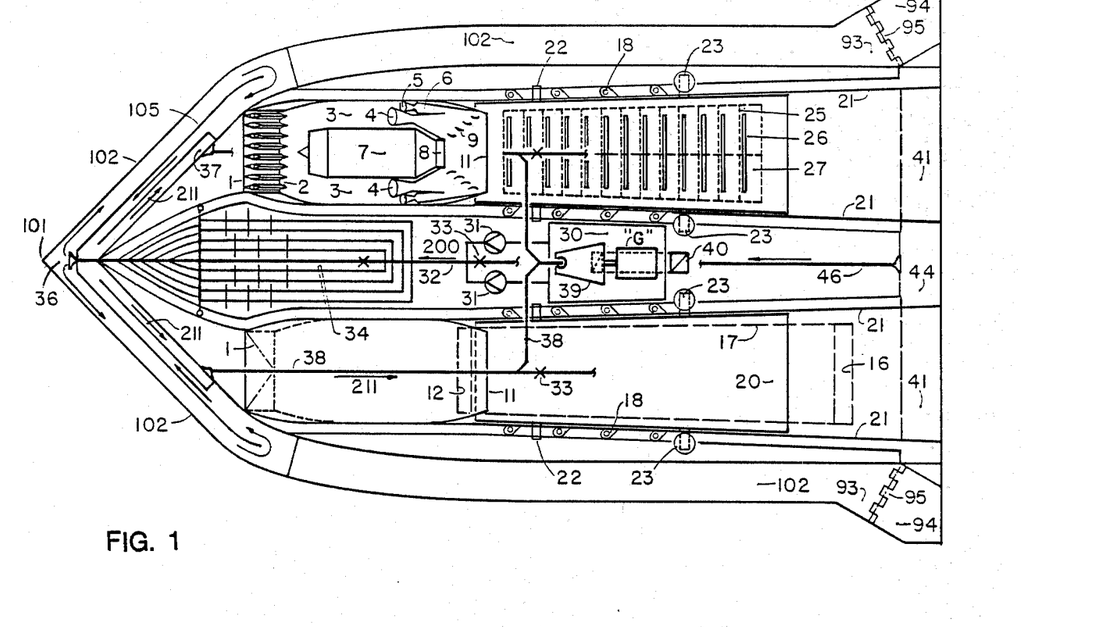
FIG. 1 is a plan view of ultra hypersonic aircraft showing the power plant including aerodynamic heat transferring system.
Figure 2:
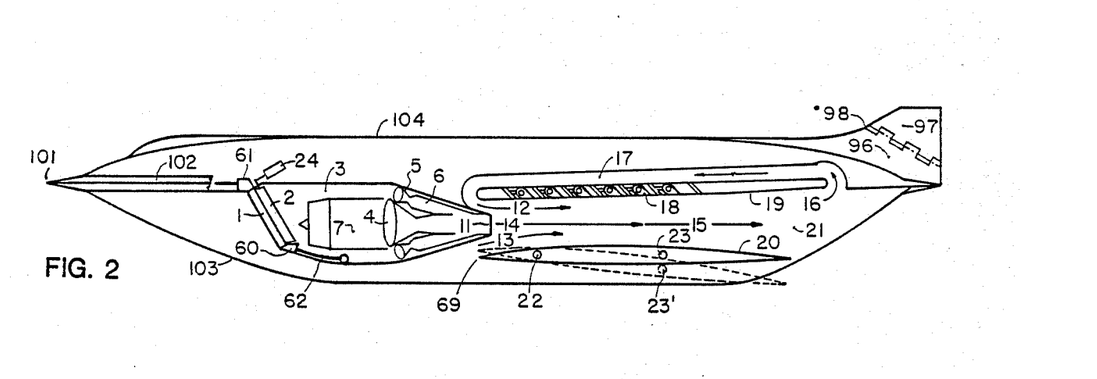
FIG. 2 is a longitudinal sectional view through a aerodynamic lift-thrust generating channel.

The preferred embodiment of the ultra hypersonic aircraft is illustrated in FIGS. 1 and 2. The hypersonic disk-airframe functions as the envelope of cargo space and housing of the aerodynamic power plant which produces lift-thrust forces.

The disk-airframe has a wedge shaped perimeter 102 extending from the forward nose 101 to the rearward of the airframe. The wedge shaped perimeter has a nose portion and a rearward portion, one on each side of the aircraft. The wedge perimeter 102 joins the lower airfoil disk 103 and the top airfoil disk 104. The wedge perimeter 102 extends to a bilateral fin 93 located on both sides of and rearward of the disk-airframe, a hinge joint 95 provided at the elevator 94 located at the end portion of bilateral fins 93.

The bilateral elevator 94 has a forwardly inclined hinge joint 95 affixed to horizontal fin 93. Also the disk-airframe includes vertical fins 96 located on rearward and on both sides of the top airfoil and hinge 98 with rudders 97. The rudder 97 includes a forwardly inclined hinge joint 98 attached to the vertical fin 96. The elevators 94 and rudders 97 are linked with actuators to control the flight stabilizations. The disk-airframe includes an air breathing power plant and the aerodynamic lift-thrust generating channel.

The air breathing power plant has an air inlet opening which comprises a steam cooled ram constriction vane diffuser 1 and 2 located at the forward air inlet opening of an air breathing power plant and has a steam cooled ram-induction jet oval thrust nozzle 11 located rearward of the power plant. The jet thrust nozzle 11 produces a turbo-ram induction jet oval thrust stream 14.

FIG. 2 shows the oval thrust stream 14 flows through the aerodynamic generating channel and a portion of the jet thrust peripheral flow 16 is diverted into a reverse flow duct 17. The dynamic pressure of the spreading oval thrust stream 14 induces a secondary air flow of a recycling airstream 12 and the surrounding airstream 13. This then flows over thrust stream 15 and steam cools the vacuum cell lift-thrust generating wing 20 located in the diverging contour of the aerodynamic generating channel.

FIGS. 1, 2, 3, and 4 show the aerodynamic heat transferring pipes 32, 35, and 38 which are welded to the airframe skin plate forming the aircraft structure. The airframe structure pipes extend from the rearward portion to the forward portion of the airframe structure and including an isolation pad 33 in the pipe lines. The isolation is used for separation of the characteristics of fluid in the pipe lines relative to the skin temperature of an airframe in response to the thermal gradient generated by aerodynamic heating-cooling on the high speed aircraft.

The forward section lower portion of the disk-airframe houses the aerodynamic heating system and includes a high pressure steam generation having feed water pipe 32 operatively coupled to the pumps 31 from the low pressure condensed water receiver tank 30.

Figure 3:
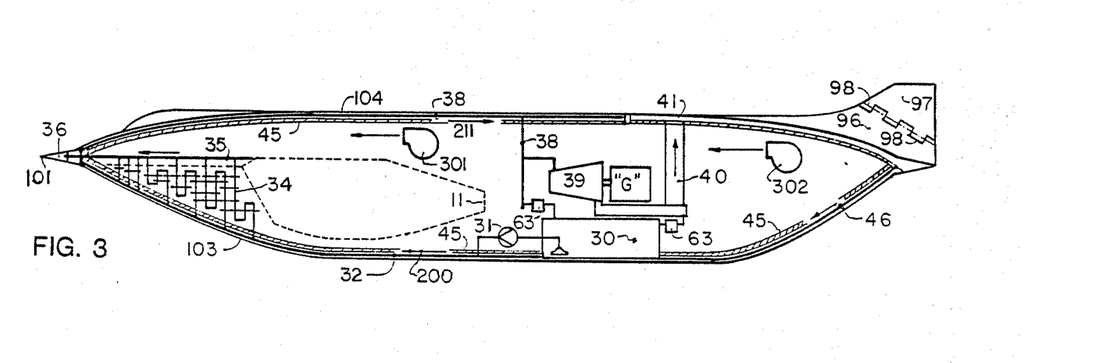
FIG. 3 is a longitudinal section view through the cockpit and payload spaces.
Figure 6:
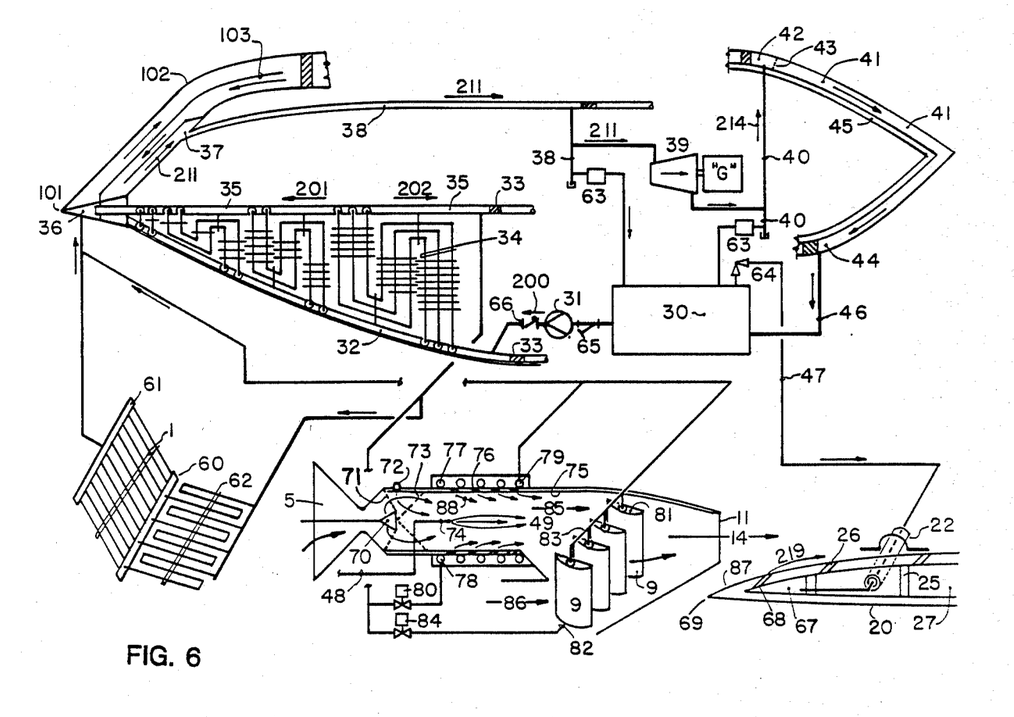
FIG. 6 is a schematic flow diagram of an aerodynamic heat steam generating system.

FIG. 3 shows the finned tube aerodynamic heat immersion coils 34 layer which cool around on the aerodynamic heating skin plate and shield insulated inner plate 45. FIG. 6 shows the finned tube coils 34 having an inlet connected from the feed water 200 pipe 32 and an outlet connected to evaporated steamflow 201 and 202 through header 35. The aerodynamic heat immersion coils 34 produce a high pressure evaporated steam 201 and 202.

FIG. 6 shows that a portion of the evaporated steam 201 flows to the leading wedge perimeter 201 and the other portion of the evaporated steam 202 flows to the ram constriction vane diffuser 1 and the steam cooled ram jet engine.

The leading wedge perimeter 102 and the ram constriction vane diffuser 1 responds to the intense aerodynamic heating to and generating superheated steam 211. The superheated steam 211 flows to the steam turbine 39 electric generator G and is discharged into the low pressure steam condenser cell 41 through the turbine discharge duct 40. The high pressure steam leg 38 and the low pressure steam leg 40 utilize steam trap 63 which are required for draining the line condensation and for system warmup.

The low pressure steam condenser cell 41 is located in the rearward section of the disk-airframe structure. The condenser cell provides aerodynamic expansion cooling to produce condensed water from the turbine discharge steam 214 which then flows into the condensed water receiver tank 30.

FIGS. 1 and 6 show that the leading wedge perimeter 102 is divided by longitudinal interior partitions 103 forming steam passages which include steam inlet 36 located adjacent the nose 101 of wedge perimeter 102, and steam outlet 37 located adjacent the rear-zone of the wedge shaped perimeter 102. The inlet 36 receives the evaporated steam 201 and the outlet 37 discharges superheated steam 211 which supplies the steam turbine 39 through the high pressure steam pipe 38.

FIGS. 1, 2, and 6 show that the ram constriction vane diffuser has rigid forward section having hollow vanes 1 which extend through the diffuser frame and which are connected to a lower steam header 60 and upper steam header 61. The lower steam header 60 pipe is connected from the evaporated steam flow 202 through header 35 and extends through the aerodynamic heat immersion coil 62 at the forward-lower portion of the engine pod. The upper steam header 61 pipe is connected to the superheated steam header. The forward section of the hollow vanes 1 passes the evaporated steam independent of the effect of aerodynamic heat gains on the ram constriction vane diffuser.

FIG. 2 shows the ram constriction vane diffuser has drivable trailing sections 2 hinged to the forward rigid sections 1 and which are linked with actuator 24 for controling the ram pressure on the turbo-ram induction jet oval thrust nozzle 11.

FIGS. 3 and 6 show the low pressure steam condenser cell 41 which is located in the rearward section of the disk-airframe and enclosed by airframe skin plate and shield by insulated inner plate 45. The condenser cell 41 has a steam inlet chamber 42 which includes a perforated baffle 43 for equal distribution. The condenser cell receives low pressure steam from the turbine discharge and condensed water outlet chamber 44 is connected to a condensed water receiver tank 30.

FIG. 6 shows that the condensed water receiver tank 30 is fitted with vaporized steam purge valve 64 and a steam purge pipe 47 sleeve is passed through fixed bearing 22 in wing support 20 and is stubbed into the steam chamber wing cell 67 located adjacent the leading edge 69 of a vacuum cell lift-thrust generating wing 20. The steam chamber wing cell 67 includes downstreamwardly inclined orifices 68 located on the top panel 87 adjacent leading edge 69 of vacuum cell wing 20 which distributes the steam 219 onto the top panel of wing as a steam film boundary layer occures between the thrust stream 14 and the wing top surface functioning to steam cool the vacuum thrust wing.

Figure 7:
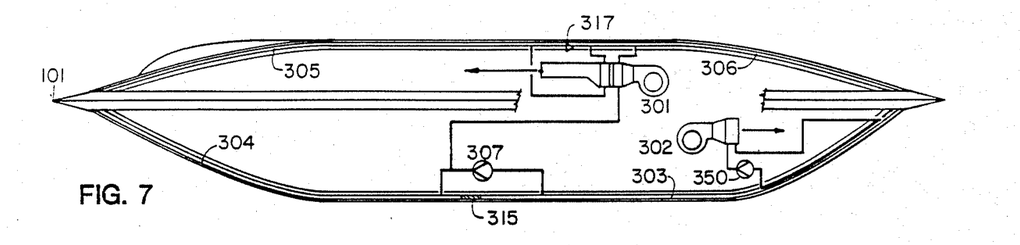
FIG. 7 is a schematic flow diagram of the low pressure water loop aerodynamic heat-cool distribution for room air conditioning and refrigeration systems.
Figure 8:
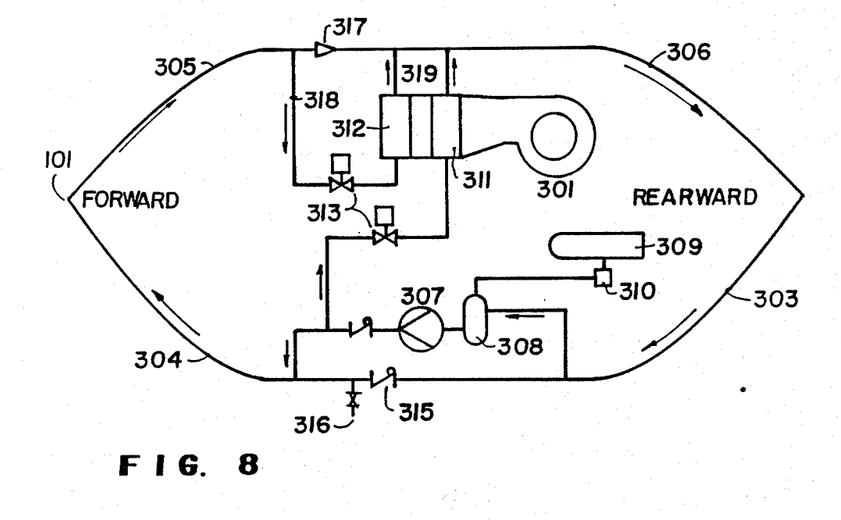
FIG. 8 is a schematic flow diagram of the room air conditioning system.
Figure 9:
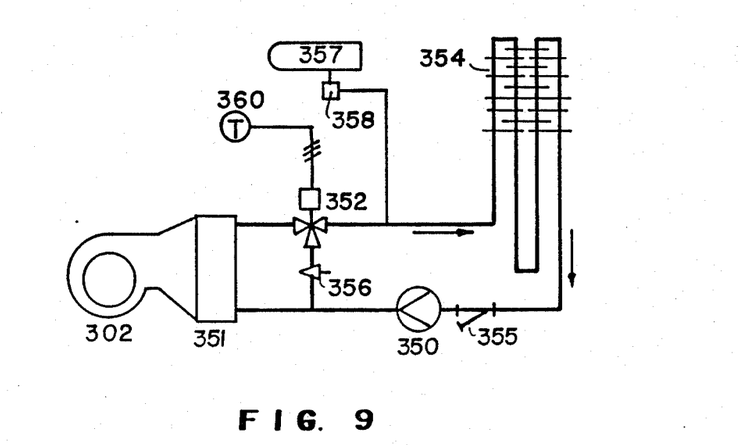
FIG. 9 is a schematic flow diagram of the refrigeration system.

FIGS. 7, 8, and 9 show that the low pressure water system comprises water circulating pipes 303, 304, 305, and 306 which are within the skin plate forming an airframe structure which extends from the rearward section to the forward section of an airframe. The low pressure defines the chilled water side of the system located in rearward section and hot water side located at the forward section. The low pressure water circulating pump 307 has a suction port connected from chilled water pipe 303 through an air separator 308 and an air cushion tank 309 having an airtrol tank fitting 310. The discharge port of circulating pump 307 is connected to the forward section for heat balancing of an airframe.

The circulating pump 307 functions as a chilled water pump to supply chilled water to the cockpit, cabin, or payload spaces. The chilled water flows through the forward lower-portion of the pipeline 304 and then through the upper portion of pipeline 305 to absorb the aerodynamic heat which produces heated hot water. The chilled water and hot water are used for room air conditioning systems which includes supply air fan 301, chilled water coil 311, hot water coil 312, and control valves 313.

FIG. 8 shows the low pressure water pipeline loop which extends from the forward position to the rearward position of the airfoil shaped disk-airframe. The chilled water pressure isolating check valve 315 and drain valve 316 through the pipeline at lower portion under pressure of the circulating pump 307. A pressure orifice 317 is provided between a supply line 318 and a return line 319 which are operatively coupled to coils 311 and 312. The pressure drop at the pressure orifice 317 is slightly greater than coil pressure drop such that water flows through the coils 311 and 312 when the control valves 313 are opened. The water loop circuit is separated by pressure check valve 315 and the pressure orifice 317. As such, the forward loop is at a higher pressure than rearward loop, defining the forward loop as the hot water generation section and rearward loop as chilled water generation section.

FIGS. 7 and 9 show that the chilled water side comprises an independent anti-freeze glycol hydronic circuit of chilled water for use as the source of coolant for the payload space refrigeration system which has a finned tube aerodynamic cooling immersion coil 354 layer positioned around the skin tube cooled of an airframe shielded with insulated inner plate. The refrigeration system includes an evaporator fan 302, coil 351, glycol circulating pump 350 with a strainer 355, a balancing valve 356 and three way control valve 352 operatively connected to the temperature controller 360. The glycol circuit has an air cushion tank 357 and an airtrol tank fitting 358.

Figure 4:
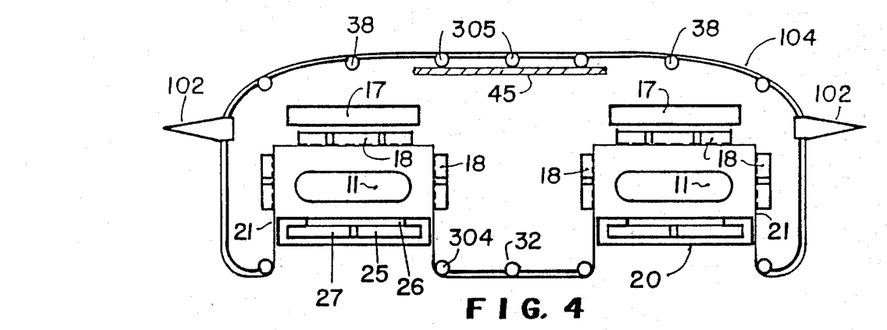
FIG. 4 is a cross sectional view of an ultra hypersonic aircraft.

FIGS. 1, 3, and 6 show the preferred embodiment of an ultra hypersonic aircraft constructed with aerodynamic heat transferring pipes forming an airframe structure having high and low pressure steam sides. The high and low pressure boundary utilizes a steam turbine 39 electric generator "G" which is electrically connected to electric infrared heaters 18. FIGS. 2 and 4 show the infrared heaters 18 are recessed in the ceiling 19 and wall 21 panels of the aerodynamic generating channel located over the vacuum cell lift-thrust generating wing 20. The electric heaters 18 are recessed with a circular-parabolic sectional shaped reflector sheath.

Figure 5:
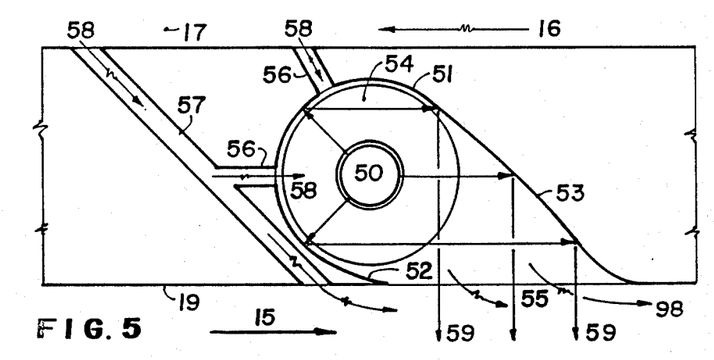
FIG. 5 is a sectional view of an infrared or arc heater.

FIG. 5 shows the reflector sheath which is in the form of a circular chamber 51 with ceramic ring spacers 54 for supporting the heater element 50. The circular chamber 51 of reflector sheath includes ventilating air slots 56 which ventilate air 58 from a reverse flow duct 17 and heated airstream 98 flowing into the aerodynamic generating channel. The reflector sheath has a radiant heat output opening 55 having a front lip 52 and rear parabolic lip 53, rear lip 53 is longer than the front lip 52. Both lips terminate on the surfaces of ceiling 19 and wall panels 21 of an aerodynamic generating channel located over the steam cooled vacuum thrust wing 20. The three way interaction of the radiant heat output 59 produces back heating of the turbo-ram thrust stream in the aerodynamic thrust generating channel.

FIGS. 1 and 6 show the steam cooled ignition-combustion chamber 6 having ram induction nozzles 4 and 5 which are located on each side of an air breathing engine 7. The shape of the oval thrust nozzle 11 accommodates a primary air inlet opening 8 which adapted to be operatively connected to the round exit nozzle of an air breathing engine 7.

The ram induction nozzle has a convergentdivergent throttle duct having a main airflow inducing nozzle 4 which communicates with fuel injecting airflow inducing nozzles 5 which extend from bellmouth shaped inlets located within the ram constriction air plenum 3. The downstream throat of its fuel injecting airflow inducing nozzle 5 is divergent to ensure an adequate ignition velocity of the flame stream within the ignition-combustion chamber 6.

FIG. 6 shows that the ignition chamber comprises a fuel injector 70, a perforated flame torch plate 71, an ignitor 72, a flame holder 73, a compressed air shooter 74, a flame bed 75 and vaporized gas injecting orifices 76. The flame bed 75 consists of an activated ceramic tile layer formed on the ignition-combustion chamber wall which extends downstream from the flame torch plate 71 to the exit of oval thrust nozzle 11 which encloses the prevaporized gas orifices 76. The flame bed functions as a flame wrapping boundary layer for the ram jet stream produced inside the ignition-combustion chamber 6.

The prevaporized gas orifices 76 produce a flame stream 88 which forms a flame wrapping boundary layer for the airstream in the ignition-combustion chamber to insure that the high velocity ignition achieves a high velocity ramjet combustion from the oval thrust nozzle 11. The compressed air pipe 48 is connected to the compressor discharge port of an air breathing engine 7 and is stubbed into the ramjet ignition-combustion chambers streamward at the center portion.

The compressed airstream 49 intercepted by the flame stream 88 from flame bed 75 in the ignition-combustion chamber results in an acceleration in the velocity of combustion and produces a ramjet stream 85 which passes through the turbo-ram induction jet oval thrust nozzle 11. The compressed air shooting ramjets are operated during low speed flight. The production of ramjets during low speed flight is achieved by the thermal bounding of flame bed 75. The velocity pressure of the compressed air stream 49 is greatly increased in the ignition-combustion chambers of the turbo-ram induction jet engine.

FIG. 6 shows the ignition-combustion chamber which comprises steam coils 77 positioned around the outstream skin surface of ignition-combustion chamber for preventing a high skin temperature from the induction jet engine. The steam coil 77 has an inlet 78 which is connected from the evaporated steam header 35 and through the control valve 80 having an outlet opening 79 which is connected to the superheated steam header.

The ramjet stream 85 is combined with turbojet stream 86 at the oval thrust nozzle 11. The ramjet stream 85 passes through the inductor vanes 9. The ceramic lined double wall inductor vanes 9 has a hollow space 81 which passes the steam thereby preventing a high skin temperature on the inductor vanes 9. As a result, an adequate high velocity oval thrust stream 14 is generated in the aerodynamic generating channel. The steam cooled inductor vane 9 has a steam inlet header 82 which is connected from the evaporated steam 202 header 202 through the control valve 84 which has a steam outlet header 83 which is connected to superheated steam header.

Figure 10:
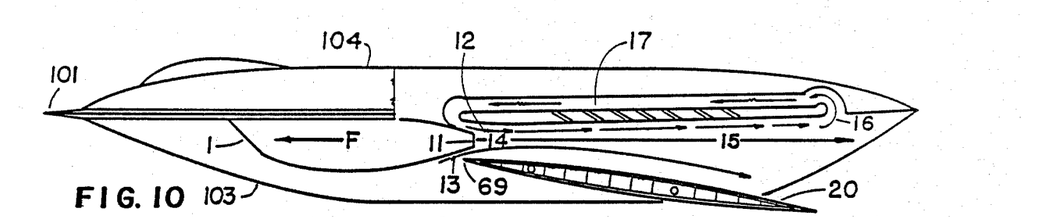
FIG. 10 is a longitudinal sectional view of an aircraft showing the lift force generation during low speed flight.

FIGS. 2 and 10 show the dynamic pressure of a spreading oval thrust stream 14 which entrains the tangential airflow of the secondary airstreams. This induces a recycling jet stream 12 and the surrounding airstream 13. The recycling jet stream 12 is the jet thrust peripheral stream 16 diverted into the forward section, upper portion of the main generating channel through the reverse flow duct 17 system. A surrounding airstream 13 is induced into the forward section, lower portion of the main generating channel through the secondary air inducing gap.

The recycled secondary air and the surrounding streams are tangentially merged with the primary air of the backburning oval thrust stream 14, to produce a flattened jet thrust stream 15 in the diverging contours of the main generating channel flow located over the vacuum cell induction lift wing 20.

The recycling of the jet stream increases the mass flow of the thermal stream and reduces the stream separation in the upper portion of the main generating channel. The recycling jet thrust peripheral stream functions as the heat-mass recovery of the induction aerodynamic system, which is similar to a thermal flywheel tire pushing against the surrounding airstream 13 to achieve a drastic conservation of thermal energy in the main generating channel used for the production of the induction aerodynamic lift-thrust forces.

An advantage of the jet recycling is that a reduction of stream separation and an increase the thickness of boundary layer at the ceiling portion of the main generating channel are achieved. This results in a reduction of the shear-stress and of the turbulence in the upper portion of the main generating channel. Such resolutions inhibit cavitation between the thrust stream 15 and the ceiling panel 19 and reduces the tendency of cold air to mix into the thrust stream in the upper portion of the main generating channel. This enhances the thermodynamic effects produced by the temperature differential which exists between the lower and the upper portion of the main generating channel.

The temperature of the flattened jet thrust stream 15 in the upper portion of main generating channel is higher than that in the lower portion thereof. This is due to the lower portion being mixed with more of the surrounding cold air in a short span period of the airstream path. The lower portion mass flow density is, therefore, greater than that in the upper portion. This increases the stream dynamic pressure on the top panel of an airfoil wing and enhances the vacuum pressure generated by the flattened jet thrust stream 15 on the vacuum cell induction lift wing 20.

FIGS. 2 and 10 show the vacuum cell induction lift wing 20 which is operatively coupled to the flattened jet thrust stream 15 is substantially parallel with the top panel of the vacuum cell induction lift wing 20 and functions to generate the vacuum within the vacuum cell. The vacuum pressure gain in the vacuum cell and cumulating vector force is varied by the incidence angle "a" of the wing 20. The vacuum pressure creates or adds to the lift-thrust forces on the wing 20.

The dynamic pressure of the flattened jet thrust stream 15 flows over the vacuum cell wing 20 with a variable incidence angle "a" which has a minimum and maximum incidence angle "a" relative to the flattened jet thrust stream 15.

FIGS. 2 and 4 show that the wing 20 is mounted on the channel walls 21 through a fixed bearing support 22, located adjacent the leading edge 69, and a drivable bearing support 23 located adjacent the trailing edge. The drivable bearings are linked with and driven by hydraulic actuators for controlling the wing incidence angle "a".

Figure 11:
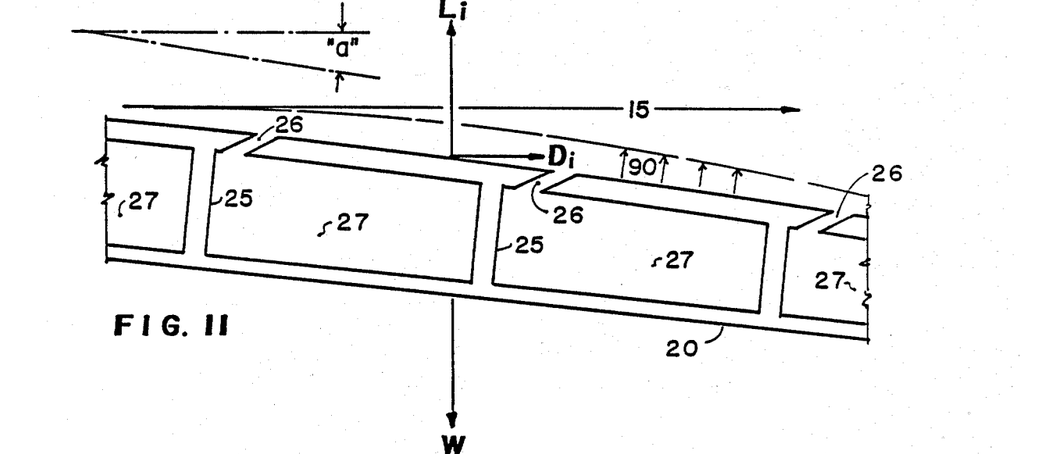
FIG. 11 is a partial sectional view of a vacuum cell wing showing the extreme incidence angle for generating the lift force during low speed flight.

FIG. 10 shows the extreme incidence angle "a" of wing position during low speed flight. FIG. 11 shows that the wing has partitions 25 which divide a hollow interior into individual cell 27. Each cell has a vacuum induction slot 26 which extends from the front partition 25 of the individual cell and which are inclined rearward of the wing. FIG. 11 shows that the vacuum pressure extends to the top surface of wing means to create a vacuum field 90 on a large area of the wing top panel. This stimulates the lift force Li generated on the wing by the flattened jet thrust stream 15. Also, an induced drag Di is generated which equals the Li tangent "a" of wing with the flattened jet thrust stream 15.

Figure 12:
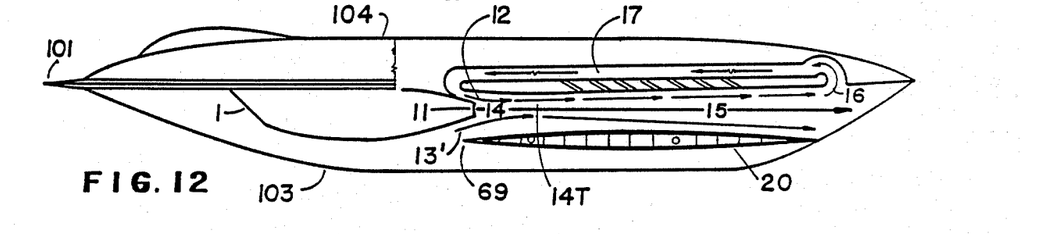
FIG. 12 is a longitudinal sectional view of an aircraft showing the thrust force generation during high speed flight.
Figure 13:
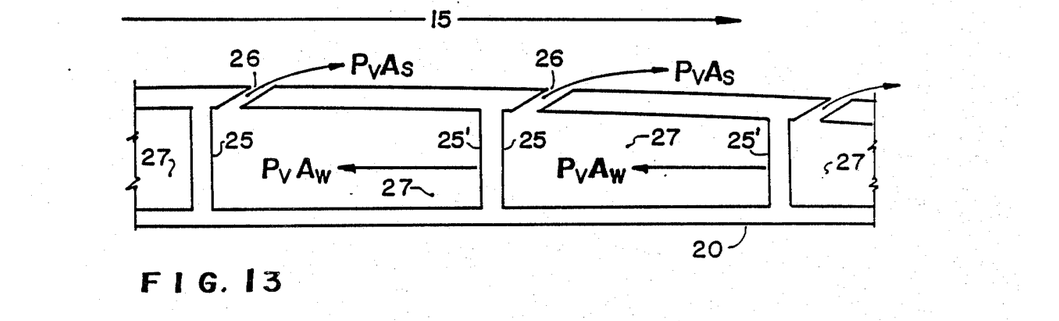
FIG. 13 is a partial sectional view of a vacuum cell wing showing the minimum incidence angle for generating the vacuum thrust force during high speed flight.

FIGS. 12 and 13 show the minimum incidence angle of the wing in position during high speed flight. The vacuum pressure is formed in the individual vacuum cells 27 stimulating the vacuum through the vacuum induction slots 26.

The vacuum pressure force gain in the vacuum cell is on the rear portion of the vacuum induction slots which stimulates a forward vacuum pressure force directed in the reactive direction of the thrust streamward. The forwarding vacuum pressure force PvAw gain on the wing cell creates the wing vacuum thrust power. The wing vacuum thrust power is generated on the speeding local wing component which promotes the forward thrust and which accelerates further the forward speed of an aircraft in response to the active vacuum in the vacuum cell wing.

The active vacuum within the vacuum cell defines a clearance gas volume. The vacuum cell induction lift wing is operated substantially without vapor material in the cell, therefore, there is nearly zero leakage of clearance gas volume. The pressure force of the suspended clearance gas volume is in proportion to the shearing stress of the flattened jet thrust stream. The stimulated vacuum force in the vacuum cell is held in pressure equilibrium by the dynamic pressure of the flattened jet thrust stream. The pressure in the vacuum cell occupied by the residual clearance gas volume maintains the upstroke of vacuum and stimulates a nearly constant vacuum force. The high vacuum is characterized by transitions from a viscous to a molecular flow of the clearance gas volume, meaning that the molecules collide more often with the tangential lip of the vacuum induction slots 26 and walls 25 of the vacuum cells 27. The pressure force of the colliding molecules is perpendicular to the surface of the vacuum cell. The vector of the vacuum direction is directed by the alignment of the vacuum induction slots 26 which stimulates a stretched vacuum force on the top panel of the airfoil shaped vacuum cell induction lift wing 20.

FIG. 11 shows the vacuum pressure vector which is tangent to the flattened jet thrust stream 15 due to the incidence angle "a" of wing for lift force Li generation. The pressure force is direct rearward which is a means for generating the induced drag Di force on the wing.

The primary force of the flattened jet thrust stream 15 induces a secondary force of the vacuum field on the vacuum cell wing. This is analogous to the principle of the primary power of the electric transformer inducing a secondary force in a magnetic field. The vector of the magnetic field is directed to its poles, and likewise, the vector of the vacuum field is nearly normal to the flattened jet thrust stream at the incidence angle of the wing.

FIG. 11 shows the normal vector which is created by the induction aerodynamic lift force Li, and the tangential component of the lift force which is created by the induced drag force Di. The lift and drag forces are generated simultaneously on the vacuum cell induction lift wing 20. The balancing of these forces occurs at the wing surface, and is a function of the velocity-density of the flattened jet thrust stream and of the incidence angle "a" of the vacuum cell induction lift wing. The induction aerodynamic lift force Li balances the gross weight W of aircraft and induced drag $D_i$ balances the gross thrust force F. This equilibrium of the forces enables the aircraft to achieve a hovering capacity in mid-air and the controlling of the lift-thrust forces enables the aircraft to achieve vertical takeoff to ultra hypersonic flight.

The variation of lift and thrust forces are introduced by the flow geometry of the flattened jet thrust stream in the aerodynamic lift-thrust generating channel. The flow geometry of an aerodynamic lift-thrust generating channel is varied by he incidence angle "a" of the vacuum cell induction lift wing, whose angle of the wing chord line is relative to the flattened jet thrust stream.

The airframe supported by the wing which is subjected to an external force of the thrust stream directed onto the wing, generates an internal force from the vacuum thrust on the wing. This internal force of vacuum thrust force is distributed to the airframe by a reactive force. The external thrust and support reactive forces are equal in magnitude and opposite in direction. The thrust stream direction is rearward and the vacuum thrust direction is forward.

FIGS. 2 and 4 show that the vacuum cell induction lift wing is mounted to the walls of the thrust generating channel through operative fixed supports 22, located adjacent the leading edge 69, and by vertical traveling drivable supports 23 located adjacent the trailing edge of a wing operatively attached to the actuators. The wing can be deflected or modulate between the maximum and minimum incidence angle "a".

FIG. 10 shows that the wing when positioned at a maximum incidence angle "a" decrease the flow geometry adjacent the leading edge 69 of wing and increase the flow geometry adjacent the trailing edge of wing. This means that the channel shaping action is divergent to the rear direction by deflection of the wing positions. The wing is positioned in the maximum incidence angle "a" for VTOL capacity generation and low speed flight.

FIG. 12 shows the wing when positioned at a minimum incidence angle with the top surface of vacuum slot wing positioned nearly parallel with the beam-line of the flattened jet thrust stream 15. The wing is operated in this position during high speed flight which means that the vacuum cell induction lift wing functions as a vacuum thrust power generating wing.

FIG. 13 shows the vacuum cell induction lift wing positioned at a minimum incidence angle and forms the forwarding vacuum vector generating wing. The vacuum vector is perpendicular to the internal surfaces of the vacuum cell and the pressure force is directed to vacuum induction slots 26. The pressure force directions are varied by the geometry of vacuum cell which, in turn, are related to the location of vacuum induction slots. FIG. 13 shows the location of vacuum induction slots 26 positioned adjacent the front partition 25 of the vacuum cell wing. The formation of vacuum vectors on the rearward surface of vacuum cell creates a forwarding pressure force gain on the wing which is generated by the rearwarding thrust stream. The vacuum cell induction lift wing is converted to a vacuum thrust power generating wing during high speed flight.

FIG. 12 shows the wing having a leading edge 69 which is positioned on the lower-inlet portion of the thrust generating channel and adjacent the oval thrust nozzle 11. A surrounding airstream gap formed between the flat span of the oval thrust nozzle 11 and the leading top panel of the airfoil shaped vacuum cell induction lift wing 20. The forward speeding airfoil wing generates a high velocity oblique ram-airstream 13' through the surrounding airstream gap which passes over the leading top panel of the airfoil wing 20.

The high velocity oblique ram-airstream 13' tangentially interacts with the backburning oval thrust stream 14 by constricting the stream to a critical pressure at the forward section of the thrust generating channel. This causes the high velocity momentum of the oblique ram-stream 13' to tangentially interact with the thermal energy of the backburning oval thrust stream 14. Also, the thrust stream 14 merges with the recycling airstream 12 at the forward section of the rearwardly elongated thrust generating channel. The tangential interaction develops the critical pressure at the high velocity freestream throat 14T located at the leading section of the thrust generating channel.

The basic principle of hypersonic speed generation is that the control of velocity in the thrust generating channel is achieved by the oblique ram-airstream 13' and the backburning oval thrust stream 14. In addition, flight speed is accelerated by the wing vacuum thrust power relative to the dynamic pressure of the flattened jet thrust stream 15 flowing over the vacuum cell wing 20.

The velocity of the expanding oblique ram-airstream 13' is faster than the free stream velocity of the flight speed, meaning that the velocity of the backburning oval thrust stream 14 is virtually less than the velocity of the oblique ram-airstream 13' during hypersonic flight.

The velocity profile of the airstream, before the freestream throat 14T in the forward section of the thrust generating channel, will attain hypersonic velocity immediately by the processing of the density changes of the backburning oval thrust stream 14 and the recycling airstream 12.

The density changes are subjected to higher velocity activation by the oblique ram-airstream 13' and the thermal effects of the backburning oval thrust stream 14 which are enhanced by the tangential interaction of thermal and momentum efforts.

The hypersonic freestream throat 14T is accelerated by the tangential interaction of the thermal energy of the backburning oval thrust stram 14 and of the velocity momentum of the oblique ram-airstream 13'. Therefore, the action of the backburning oval thrust stream 14 produces forward propulsion during low speed to supersonic flight. The action of the backburning oval thrust stream 14 is a thermal effect which interacts with the high velocity oblique ram-airstream 13' during hypersonic flight to produce an expanded hypersonic thrust stream in the diverging contour of the thrust generating channel after the freestream throat 14T and which flows over the vacuum power generating wing 20.

The wing vacuum power generation is illustrated in the FIG. 13. The individual cells 27 are fabricated by front partition 25 and a rear partition 25' within the hollow wing. The vacuum induction slot 26 extends from the front partition 25 and are inclined toward rearward on top panel of the vacuum cell wing 20.

The thrust stream flows parallel and rearward on the top panel of vacuum cell wing and slipflows over the vacuum induction slots 26 to induce a vacuum within the wing cell. The vacuum vector is produced on the interior surface of wing cell with pressure force which is directed to the vacuum induction slots 26, creating a forwarding vacuum pressure cylinder in the wing cell, which vacuum pressure force is a beating force to the thrust streamward.

The forwarding vacuum pressure force gain on the vacuum pressure cylinder of the wing structure is transmitted to the airframe structure through the wing supports. This promotes the forward thrust force, which is the vacuum thrust force generated on the wing.

The vector distribution of vacuum pressure force in the vacuum cell wing depends on the location of vacuum induction slot on the top panel of the wing relative with the direction of thrust stream. For example, if the vacuum induction slots are adjacent the rear partition, the pressure vector is directed rearward. This creates a strong drag force which is generated on the wing. On the other hand, if the vacuum induction slots are located adjacent the front partition, as shown in FIG. 13, the pressure vector is directed forward. This creates a strong forward force on the wing.

The vacuum pressure clearance is nearly constant in the large area of vacuum cylinder and the pressure force is directed to small area of the vacuum induction slot 26 on the top panel of the wing. The pressure accumulated on the wing area means force is created. The forwarding vacuum pressure Pv activate vacuum induction slot area As. The vacuum pressure Pv is nearly constant, therefore, the vacuum cell wing generates its vacuum thrust force during high speed flight with a minimum incidence angle of the wing relative to the thrust stream.

The vacuum cell wing generates the lift force during low speed flight at a maximum angle of the wing relative to the thrust stream by adjusting the incidence angle of the wing relative to the speed of flight, the action of its wing is converted to a vacuum thrust generating wing during high speed flight. This means that the aerodynamic lift generating channel is converted to an aerodynamic thrust generating channel. The wing vacuum thrust power is independent of the relationship between the air cushion thrust and the speed of flight. Thus, the wing vacuum thrust power is generated on the speeding local wing component which further accelerates the forward speed of an aircraft.

The vacuum thrust power is generated by the tangential stress of the thrust stream relative to the density and velocity of the flattened jet thrust stream. The velocity of the flattened jet thrust stream is generated by the tangential interaction of the backburning thermal energy of an oval thrust stream, the velocity momentum of an oblique ram-airstream and the thermal mass of a recycling airstream. Combination of the above three components of thermal, momentum and mass effects are a tangential interaction and the same are responsive to infrared radiant heat and generate a hypersonic thrust stream in the aerodynamic thrust generating channel resulting in the ultra hypersonic aircraft.

I claim:

1. An ultra hypersonic aircraft comprising
   means defining an airfoil shaped disk airframe structure;
   a pipe structure which extends from the rearward section of the airframe structure to the forward section of the airframe structure, said pipe structure including an isolation pad for separation of the fluid and steam within the pipe structure based on the characteristics thereof relative to the skin temperature of an aircraft due to the thermal gradient generated by aerodynamic heating-cooling on the high speed aircraft, said pipe structure having a high pressure steam generating side at the forward section thereof comprising high pressure steam and feed water pipes having thermal collecting fintube aerodynamic heat immersion coils loop around an aerodynamic heating skin plate which is shielded by an insulated inner plate within the airframe, said pipe structure having a low pressure steam condensation side at the rearward section of an airframe structure comprising a steam condenser cell located between an aerodynamic cooling skin plate and an insulated inner plate within the airframe structure and low pressure water circulating pipes located through out the rearward section to forward section of the airframe structure; and
   a low pressure water circulation means including means defining a chilled water zone at the rearward section of the aircraft structure and hot water zone at the forward section of the airframe structure, said chilled water zone and the hot water zone being adapted to be used for room air conditioning system.

2. The ultra hypersonic aircraft of claim 1 further comprising
   an independant anti-freeze glycol hydronic system for the chilled fluid and the hot fluid, said hydronic system being used for the aircraft refrigeration system and for an air conditioning system adapted for use for in a cockpit and cabin spaces.

3. The ultra hypersonic aircraft of claim 2 wherein said hydronic system include chilled water coils and hot water coils, supply air fans, water circulating pumps and control valves for transferring the aerodynamic heating and cooling from the chilled fluid coils and hot fluid coils to provide the cooling and heating from the high speed aircraft.

4. The ultra hypersonic aircraft of claim 1 further comprising
   a steam turbine electric generator which is operatively coupled to said pipe structure and which functions as the high and low pressure steam boundary, said electric generator being electrically connected to electric heaters which are recessed on the ceiling and wall panels of an aerodynamic generating channel, said electric heaters each having a circular-parabolic sectional shaped reflector sheath, said reflector sheath comprising a circular chamber with ceramic ring spacers for supporting the electric heater elements, said reflector sheath further including ventilating air slots and radiant heat output openings having front and rear parabolic lips which extend from said circular chamber, said rear lip being longer than said front lip with both lips terminating on the surface of the ceiling and wall panels, said radiant heat output openings being oriented in three direction towards the wall panel and ceiling of an aerodynamic generating channel located over a steam cooled vacuum thrust wing for back heating of a turbo-ram thrust stream flowing in the aerodynamic lift-thrust generating channel of an ultra hypersonic aircraft.

5. The ultra hypersonic aircraft of claim 4 wherein the aircraft includes an aerodynamic generating channel having a ceiling surface positioned over a steam cooled vacuum cell lift-thrust generating wing and wherein the aerodynamic generating channel receives a turbo-ram thrust stream produced from a turbo-ram jet engine, said aerodynamic generating channel further including electric heaters located in the ceiling thereof and wherein said electric heaters are operatively coupled to the electric generators to heat the turbo-ram thrust stream passing through said aerodynamic generating channel.

6. The ultra hypersonic aircraft of claim 5 wherein the aircraft further comprises
   a condenser coil operatively coupled to the low pressure fluid system and located between the insulated plates of the aircraft, said condenser coil receiving fluid from the steam turbine electric generator and condensing the steam into the condensed water receiver tank and transmitting the cooled fluid to the aerodynamic heating coils located at the forward section of the aircraft for generating steam from the condensed fluid , said steam generated by the aerodynamic heating coil being distributed through orifices in the vacuum lift-thrust generating wing over the top surface thereof to enhance the vacuum thrust force of the vacuum lift-thrust generating wing.

7. The ultra hypersonic aircraft of claim 1 wherein the aircraft includes an air breathing jet engine and a ram induction jet thrust with the inlet thereof positioned around the outlet of said air breathing jet engine and wherein the ram induction jet thrust has a thrust generating chamber that terminates in an oval thrust nozzle, said thrust generating chamber including
   a steam cooling coil located in the wall of said thrust generating chamber for cooling the chamber by absorbing heat from the combustion to prevent the outside skin temperature of the thrust generating chamber from reaching a high temperature.

8. The ultra hypersonic aircraft of claim 1 wherein the aircraft includes an air breathing jet engine and a ram induction jet engine with the inlet thereof positioned around the outlet of said air breathing jet engine and wherein the ram induction jet engine has a thrust generating chamber having an outer skin and wherein the thrust generating chamber terminates in an oval thrust nozzle for passing a turbo-ram jet stream, said thrust generating chamber including a steam coil positioned around the outer skin surfaces thereof preventing high skin temperature from a ram induction jet engine, said ram induction jet stream passing through inductor vanes located at the inlet of said thrust generating chamber, said low pressure water circulation means including a steam loop comprising thermostatic pressure relief valves for cooling of the vacuum lift-thrust wing and cooling of the outer skin of the thrust generating combustion chamber.

9. An ultra hypersonic aircraft comprising means defining an airfoil shaped disk airframe constructed with aerodynamic heat transferring pipes forming an airframe structure having high pressure feed water pipes and an evaporated steam header connected to the pipes wherein the header includes finned tube aerodynamic heat immersion coils located on the forward lower portion of the airframe in the vicinity of the aerodynamic compression zones of the disk airframe for evaporating a fluid contained therein to generate steam wherein said generated steam produces a stream flow to a leading wedge perimeter of the aircraft and a portion of said stream flow is transported by said pipes to a ram constriction vane diffuser where the steam is passed through vanes of said ram constriction vane diffuser.

10. The ultra hypersonic aircraft of claim 9 wherein said leading wedge perimeter has a nose portion and a rearward portion and wherein the same is divided by longitudinal partitions forming a steam passageway which includes a steam inlet and outlet, the steam inlet being located adjacent the nose portion of the wedge perimeter which receives the steam flow and the steam outlet being located in the rearward portion of the leading wedge perimeter to discharge superheated steam which is supplied by the pipes to a steam turbine.

11. The ultra hypersonic aircraft of claim 9 having a turbo-ram induction jet oval thrust nozzle wherein said ram constriction vane diffuser includes multiple vertically inclined vanes which are equally spaced in the diffuser frame, said ram constriction vane diffuser having rigid forward section of hollow vanes extending through the diffuser frame which are operatively connected to lower and upper steam headers, said ram constriction vane diffuser having vanes wherein the forward edges thereof are hinged to pivotal trailing sections thereof which are linked to and driven by an actuator for controlling the ram pressure on the turbo-ram induction jet oval thrust nozzle of the ultra hypersonic aircraft

* * * * *